US010532518B2

(12) United States Patent
Gurvich et al.

(10) Patent No.: US 10,532,518 B2
(45) Date of Patent: Jan. 14, 2020

(54) HYBRID METALLIC/COMPOSITE JOINT WITH ENHANCED PERFORMANCE

(71) Applicant: Goodrich Corporation, Charlotte, NC (US)

(72) Inventors: Mark R Gurvich, Middletown, CT (US); Rony Giovanni Ganis, Oakville (CA); Virginia H Faustino, Coventry, CT (US)

(73) Assignee: Goodrich Corporation, Charlotte, NC (US)

( * ) Notice: Subject to any disclaimer, the term of this patent is extended or adjusted under 35 U.S.C. 154(b) by 132 days.

(21) Appl. No.: 15/285,973

(22) Filed: Oct. 5, 2016

(65) Prior Publication Data

US 2018/0093422 A1    Apr. 5, 2018

(51) Int. Cl.
| | |
|---|---|
| *B29C 65/00* | (2006.01) |
| *B29C 43/20* | (2006.01) |
| *B29C 63/18* | (2006.01) |
| *B29L 31/24* | (2006.01) |

(52) U.S. Cl.
CPC ............ *B29C 66/612* (2013.01); *B29C 43/20* (2013.01); *B29C 63/18* (2013.01); *B29C 66/742* (2013.01); *B29L 2031/24* (2013.01)

(58) Field of Classification Search
CPC ......... Y10T 403/3941; Y10T 403/4688; Y10T 403/4924; Y10T 403/4941; Y10T 403/4958; Y10T 403/4966; Y10T 403/7064; Y10T 403/74; F16B 7/02; F16B 7/025; F16B 7/0413; F16B 11/002; F16B 17/002; F16B 17/004; F16B 17/006; F16L 58/187; F16L 58/10; F16L 25/0072
USPC .... 403/193, 261, 277, 279, 281, 282, 374.1, 403/404; 285/334.5, 55
See application file for complete search history.

(56) References Cited

U.S. PATENT DOCUMENTS

| | | | | |
|---|---|---|---|---|
| 3,778,185 A | * | 12/1973 | Plowman | F02C 7/20 415/209.4 |
| 4,225,158 A | * | 9/1980 | Puechavy | F16L 33/01 285/222.2 |
| 4,319,076 A | * | 3/1982 | Piur | H01B 17/32 174/178 |
| 4,647,078 A | * | 3/1987 | Lundy | E21B 17/042 285/115 |

(Continued)

FOREIGN PATENT DOCUMENTS

| | | | | |
|---|---|---|---|---|
| DE | 4135695 A1 | * | 4/1993 | ........... B29C 53/587 |
| WO | 2008057405 | | 5/2008 | |

OTHER PUBLICATIONS

European Patent Office, European Search Report dated Feb. 16, 2018 in Application No. 17195042.1-1013.

*Primary Examiner* — Matthieu F Setliff
(74) *Attorney, Agent, or Firm* — Snell & Wilmer, L.L.P.

(57) ABSTRACT

A metallic/composite joint may comprise a composite member having a flared end or an angled end, a liner perimetrically surrounding the composite member, and a metallic member perimetrically surrounding the liner. A first side of the liner contacts the composite member and a second side of the liner contacts the metallic member. The liner perimetrically surrounds at least a portion of the flared end. A through-thickness compressive stiffness of the liner may be less than a similar stiffness of the composite member.

18 Claims, 8 Drawing Sheets

(56) References Cited

U.S. PATENT DOCUMENTS

| | | | | |
|---|---|---|---|---|
| 4,813,715 | A  * | 3/1989 | Policelli | F16L 47/04 |
| | | | | 138/109 |
| 4,834,932 | A  * | 5/1989 | Salzman | B29C 66/534 |
| | | | | 264/250 |
| 6,042,152 | A | 3/2000 | Baldwin | |
| 6,361,080 | B1 * | 3/2002 | Walsh | F16L 23/024 |
| | | | | 285/222.1 |
| 6,435,757 | B1 | 8/2002 | Casella | |
| 7,731,593 | B2 * | 6/2010 | Dewhirst | F16C 3/026 |
| | | | | 464/181 |
| 8,205,315 | B2 * | 6/2012 | Mullen | F16C 7/026 |
| | | | | 280/93.511 |
| 8,424,921 | B2 * | 4/2013 | Marlin | B29C 70/32 |
| | | | | 285/222.1 |
| 9,388,927 | B2 * | 7/2016 | Shmelev | F16L 33/2071 |
| 9,545,762 | B2 * | 1/2017 | Marlin | B29C 70/32 |
| 2005/0067037 | A1 | 3/2005 | Salama | |
| 2015/0027720 | A1 | 1/2015 | Spencer | |
| 2015/0284957 | A1 | 10/2015 | Ganis | |
| 2017/0198734 | A1 * | 7/2017 | Bernard | F16C 7/026 |

* cited by examiner

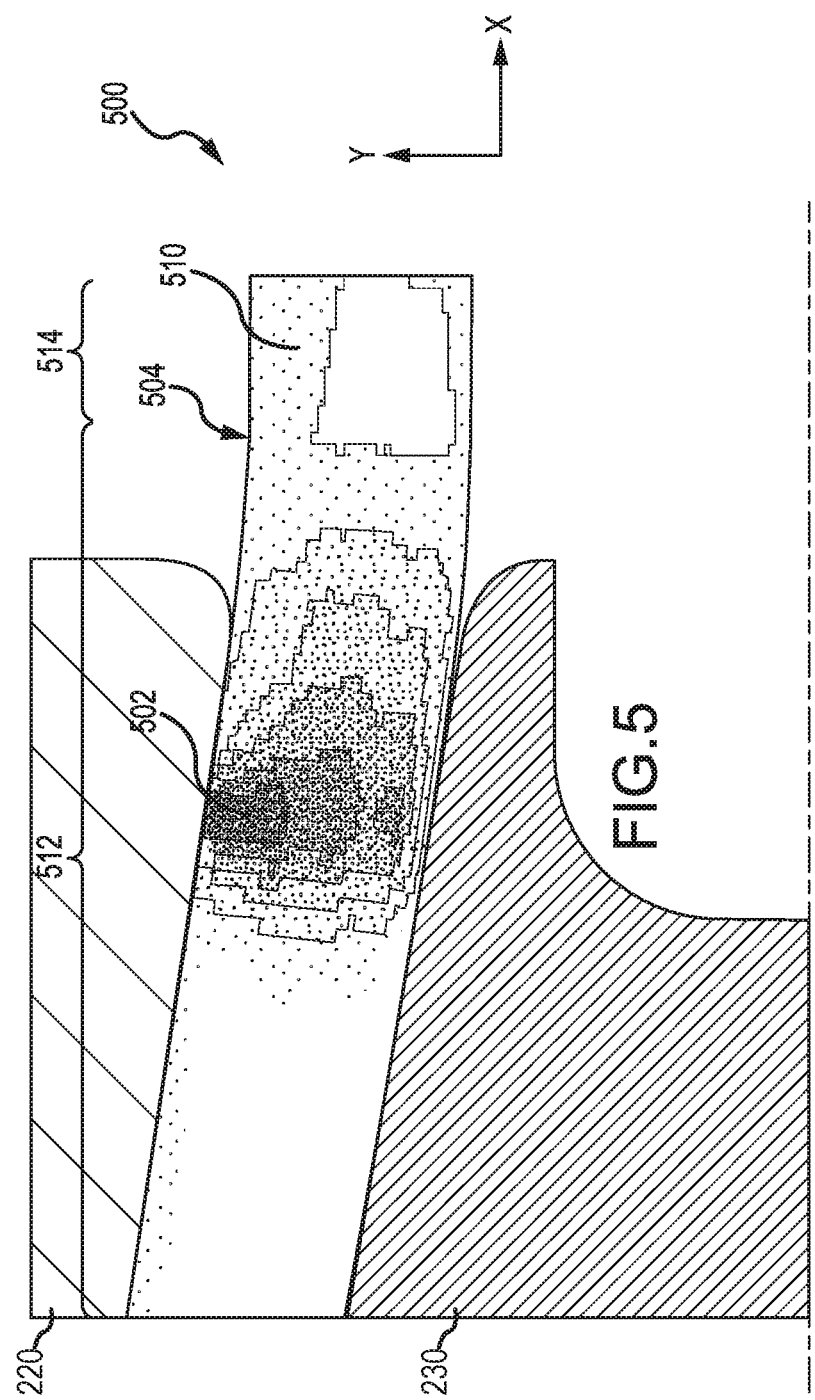

HYBRID METALLIC/COMPOSITE JOINT WITH ENHANCED PERFORMANCE

FIELD

The present disclosure relates generally to metallic/composite joints and more specifically to metallic/composite joints having composite rod elements.

BACKGROUND

Conventionally, various types of aircraft utilize actuators including, for example, to deploy nose, body, and/or wheel landing gear systems. Conventional actuator components are made of metallic materials and often comprise complex geometries and high strengths. However, these metallic components are typically heavy.

Substitution of metals by fiber-reinforced polymer-matrix composites (PMC) is one way to reduce weight of landing gears or aircraft actuators. Among significant challenges is implementation of strong joints for load transfer from composite members to metallic parts. The composite rod elements are typically fabricated in the form of tubes or solid cylindrical elements and are capable of handling significant axial loads under both tension and compression.

SUMMARY

A metallic/composite joint comprising a composite member having one of a flared end or an angled end, the angled end angled inward towards a centerline axis of the composite member, a liner perimetrically surrounding the composite member, and a metallic member perimetrically surrounding the liner, wherein a first side of the liner contacts the composite member and a second side of the liner contacts the metallic member.

In various embodiments, the liner may perimetrically surround at least a portion of the one of the flared end or the angled end. The metallic/composite joint may further comprise an insert positioned at least partially within the one of the flared end or the angled end. The one of the flared end or the angled end may be compressed between the metallic member and the insert. The metallic/composite joint may further comprise a second liner perimetrically surrounding the insert. A first side of the second liner may contact the composite member and a second side of the second liner may contact the insert. The first side of the second liner may contact the one of the flared end or the angled end of the composite member. A stiffness of the liner may be less than a stiffness of the composite member. The liner may comprise at least one of an elastic polymer (elastomer), a polymer, or a fabric.

A metallic/composite joint may comprise a composite member having one of a flared end or an angled end, a metallic member at least partially perimetrically surrounding the one of the flared end or the angled end, the angled end angled inward towards a centerline axis of the composite member, an insert positioned at least partially within the one of the flared end or the angled end, and a liner perimetrically surrounding the insert, wherein a first side of the liner contacts the composite member and a second side of the liner contacts the insert.

In various embodiments, the liner may contact at least a portion of the one of the flared end or the angled end. The liner may be located between the composite member and the insert. The one of the flared end or the angled end may be compressed between the metallic member and the insert.

The metallic/composite joint may further comprise a second liner perimetrically surrounding the composite member. A first side of the second liner may contact the composite member and a second side of the second liner may contact the metallic member. The first side of the second liner may contact the one of the flared end or the angled end of the composite member. A through-thickness compressive stiffness of the liner may be less than a through-thickness compressive stiffness of the composite member. The liner may comprise at least one of an elastic polymer (elastomer), a polymer, or a fabric.

A method for assembling a metallic/composite joint may comprise positioning a liner to perimetrically surround at least a portion of a composite member, and positioning a metallic member to perimetrically surround the liner, wherein the liner is located between the metallic member and the composite member, and wherein a through-thickness compressive stiffness of the liner is less than a through-thickness compressive stiffness of the composite member.

In various embodiments, the method may further comprise positioning an insert at least partially into the composite member, and compressing the composite member between the metallic member and the insert.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 5 illustrates a contour plot of shear stress of a composite member having a flared end of a metallic/composite joint under tension, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

The present disclosure describes metallic/composite joints having composite tubes. Such joints may be used in aircraft systems, such as, for example, landing gear systems. However, the systems and methods of the present disclosure may be suitable for use in non-aircraft systems as well. The present disclosure may be used in metallic/composite joints having composite members with solid cross-sections without cavities. In addition, cross-sections of the composite members, orthogonal to the element centerline, may have different shapes such as circular, rectangular, polygonal, or any other shape capable of handling axial loads applied to the metallic/composite joint. The present disclosure may be applied to non-cylindrical composite members with two-dimensional designs, where the liner is applied to the top and/or the bottom of the composite member.

Substitution of metals by fiber-reinforced polymer-matrix composites (PMC) is one way to reduce weight of landing gears or aircraft actuators. Among significant challenges is implementation of strong joints for load transfer from composite members to metallic parts. The composite members are typically fabricated in the form of tubes and are capable of handling significant axial loads under both tension and compression. Significant stress concentrations may be generated in response to axial loading of the composite tube.

Figure 1:
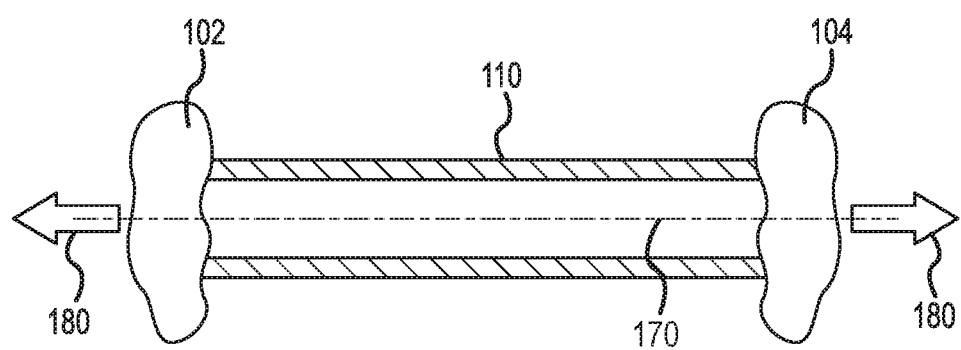
FIG. 1 illustrates a composite member having joints for transferring axial loads, in accordance with various embodiments.

With reference to FIG. 1, a composite member 110 is illustrated having a first joint 102 and a second joint 104. An axial load is illustrated by arrows 180. Composite member 110 may extend along centerline axis 170. Composite member 110 may comprise a cylinder. In various embodiments, composite member 110 may comprise a solid cylinder without an aperture extending along the centerline axis. In various embodiments, composite member 110 may comprise a hollow cylinder with an aperture extending along the centerline axis. In this regard, composite member 110 may comprise a tube. It should be appreciated that composite members comprising solid cylindrical and/or tubular geometries exhibit significant tensile and compressive strength (i.e., mechanical loads along centerline axis 170) and/or bending. In various embodiments, the weight, strength, and stiffness of composite tubes may be dictated by fiber type, fiber stiffness, fiber strength, fiber direction/placement, resin system used, and other parameters of the composite lay-up. In contrast, structural behavior of metallic elements is generally only dictated by the material type and dimension of the metallic elements themselves.

Figure 2A:
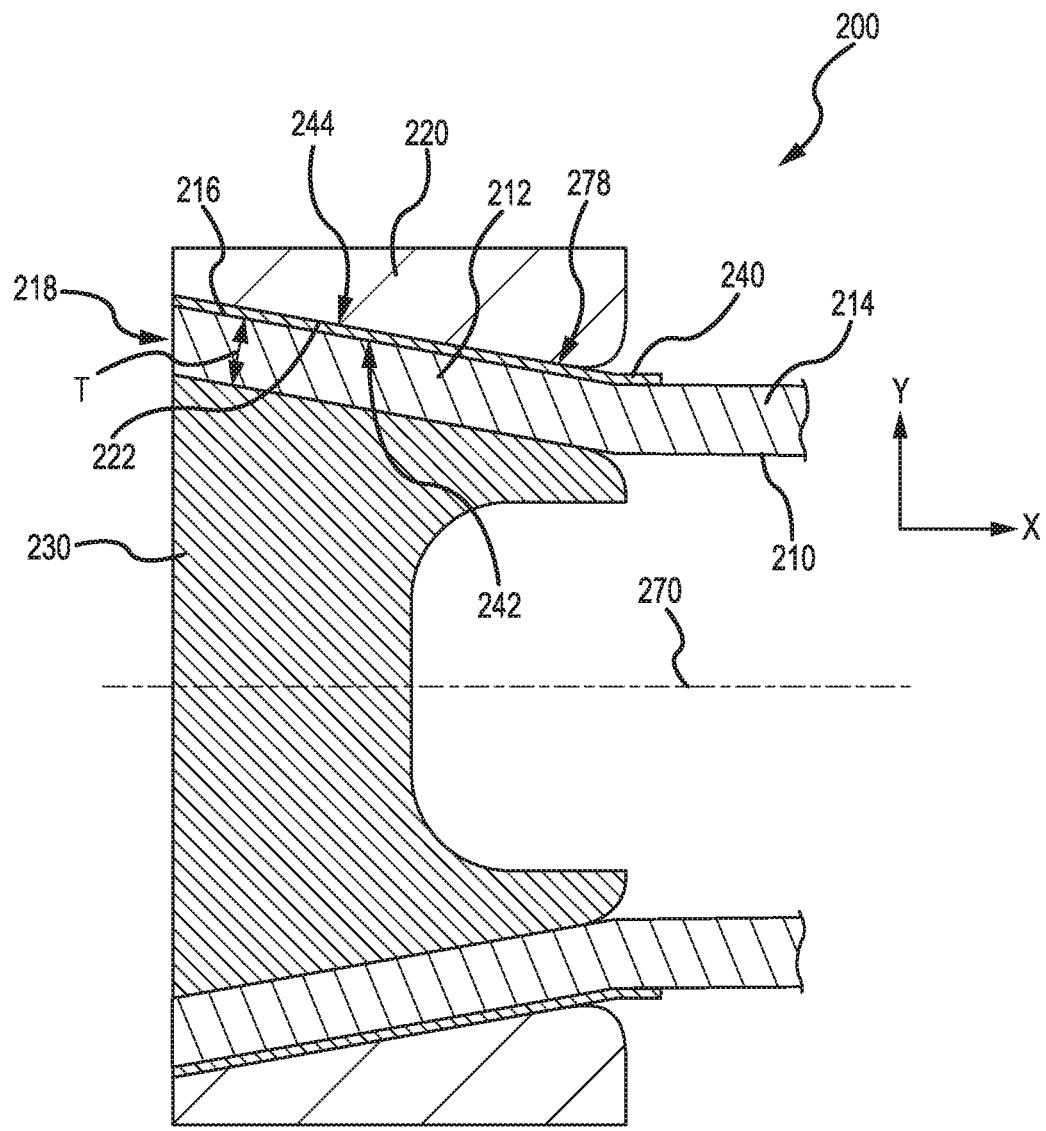
FIG. 2A illustrates a cross-section view of a metallic/composite joint having a liner disposed radially outward of a composite member having a flared end, in accordance with various embodiments.

With reference to FIG. 2A, a cross section view of a metallic/composite joint 200 is illustrated, in accordance with various embodiments. Metallic/composite joint 200 may comprise a metallic member 220 and a composite member 210. Composite member 210 may comprise, for example, a lightweight polymer matrix composite such as a carbon fiber reinforced composite material, a hydrocarbon fiber reinforced composite material, a glass fiber reinforced composite material, or composite reinforced with other fibers. Although composite materials provide reduced weight over traditional metal components, it may be difficult to couple composite materials to metal components. Conventional methods of attaching composite materials to other materials, such as threading or drilling holes in the composite material, may significantly reduce the strength of the composite material. Other conventional methods may include bonding or gluing to provide a load path between two or more components. Therefore, methods and apparatus for connecting composite material components (such as composite member 210) to other components (such as metallic components) may be desirable.

In various embodiments, metallic/composite joint 200 may comprise a joint suitable for use in body-type landing gear systems. Further, metallic/composite joint 200 may comprise a joint suitable for use in other systems, including flight control systems, wing and nose landing gear systems, and any other system which utilizes metallic/composite joints, including non-aircraft systems.

Composite member 210 may comprise a cylinder 214 having a flared end 212. Composite member 210 may comprise terminus 218. Composite member 210 may extend along centerline axis 270. Flared end 212 may comprise an outer surface 216. Outer surface 216 may be oriented at an angle with respect to centerline axis 270. In various embodiments, outer surface 216 may comprise a radially outer surface.

Metallic member 220 may perimetrically surround composite member 210. Metallic member 220 may perimetrically surround flared end 212 of composite member 210. Metallic member 220 may comprise an inner surface 222 comprising a profile that is complementary to flared end 212 and/or cylinder 214. Inner surface 222 may be oriented at an angle with respect to centerline axis 270. In various embodiments, inner surface 222 may comprise a radially inner surface.

With reference to FIG. 5, a contour plot 500 of shear stress of a composite member 510 under tension is illustrated, in accordance with various embodiments. Composite member 510 may be similar to composite member 210 (see FIG. 2A). Composite member 510 may comprise cylindrical portion 514. Composite member 510 may comprise flared end 512. The contour plot 500 illustrates location 502 of maximum shear stress. Location 502 is illustrated near the junction 504 of cylindrical portion 514 and flared end 512. With combined reference to FIG. 2A and FIG. 5, location 502 may be located axially in line with metallic member 220. Location 502 may be in close proximity to the axially inward (relative to terminus 218) junction 278 between inner surface 222 of metallic member 220 and composite member 210.

With reference to FIG. 2A, a liner (also referred to herein as a first liner) 240 may be located between inner surface 222 and outer surface 216, in accordance with various embodiments. Liner 240 may aid in decreasing the maximum shear stress of composite member 210 under tension. Table 1 below provides the maximum shear stress of a composite member under tension with and without liner 240 generated for a representative metallic/composite design. A fifty-six percent (56%) reduction in maximum shear stress may be achieved in response to placing liner 240 between composite member 210 and metallic member 220 as illustrated in FIG. 2A. It is also contemplated herein that maximum shear stress reductions of greater than 56% may be achieved in response to variations of the composite structure of composite member 210 (i.e., fiber orientation), the stiffness of liner 240, geometry of the joint, and/or the magnitude of the tension force.

TABLE 1

| Design | Dimensionless Max Shear Stress |
|---|---|
| Without liner 240 | 1x |
| With liner 240 | 0.435x |
| Stress reduction | >56% |

In various embodiments, liner 240 may comprise a through-thickness compressive stiffness which is less than the through-thickness compressive stiffness of composite member 210. In this regard, through-thickness orientation may refer to a direction orthogonal to a contact surface between the liner 240 and the composite member 210. In general, liner 240 may comprise a through-thickness compressive stiffness of 0.95 or less of the corresponding through-thickness compressive stiffness of the adjacent composite element. Corresponding comparison, in this regard, means evaluation on samples of the same or similar in-plane sizes.

In various embodiments, liner 240 may comprise an elastic polymer (elastomer) such as, for example, a natural rubber, a synthetic rubber, polytetrafluoroethylene (PTFE), or any other suitable elastomer. Liner 240 may also comprise any suitable polymeric material or polymeric blend. Liner 240 may comprise elastomers or polymers with reinforcement such as, for example, woven fabric, uni-directional fibers, short fibers, or their combinations. Liner 240 may be either homogeneous through the thickness or consists of several different layers. Liner 240 may comprise other materials such as, for example, un-pregnated woven fabric or an unwoven fabric. Liner 240 may be either homogeneous in its in-plane directions or have segments with different properties. Liner 240 may be continuous or consists of separate connected or disconnected pieces.

A first side 242 of liner 240 may contact outer surface 216 of flared end 212. A second side 244 of liner 240 may contact inner surface 222 of metallic member 220. Liner 240 may be coupled to composite member 210. In various embodiments, liner 240 may be stretched over flared end 212. In various embodiments, liner 240 may be wrapped around flared end 212. In various embodiments, liner 240 may comprise a single unitary member. Liner 240 may comprise a thickness which is less than the wall thickness T of composite member 210. In various embodiments, liner 240 may comprise a constant thickness. In various embodiments, liner 240 may comprise a varying thickness.

With continued reference to FIG. 2A, flared end 212 may be formed of a lightweight polymer matrix composite material. For example, flared end 212 may comprise the same material as cylinder 214. Flared end 212 may be configured to provide a flared surface to engage with a metal component, such as metallic member 220 for example. Flared end 212 may be secured against and held within metallic member 220, eliminating the need for threading or drilling of flared end 212 and/or cylinder 214, which may reduce the strength of and/or compromise the structural integrity of composite member 210.

Cylinder 214 and flared end 212 may be formed by laying composite sheets or layers in a desired shape and bonding the layers together using resins, adhesives, or other bonding agents. In various embodiments, cylinder 214 and flared end 212 may be formed using a fiber-wound form, wherein fiber is continuously, or in several steps, wound onto the form and bonded together using resins, adhesives, or other bonding agents. Any manner of forming cylinder 214 and flared end 212 is within the scope of the present disclosure.

During or after formation, flared end 212 may be pretensioned. For example, flared end 212 may be pretensioned for tensile and/or compressive loads. Such pretensioning may reduce fretting and/or extend the fatigue life of flared end 212.

In various embodiments, an insert 230 may be positioned within flared end 212. Flared end 212 may comprise a frustoconical geometry. Insert 230 may comprise a frustoconical geometry. The geometry of insert 230 may be complementary to the geometry of flared end 212. In various embodiments, insert 230 may be positioned within flared end 212 and held under compression by components located outside composite member 210. In various embodiments, insert 230 may be glued or bonded to composite member 210. In various embodiments, insert 230 may be placed within flared end 212 during formation of cylinder 214 and flared end 212. In various embodiments, insert 230 may be placed within flared end 212 after formation of cylinder 214 and flared end 212. Insert 230 may comprise, for example, a metallic material. However, insert 230 may comprise any suitable material.

With respect to FIG. 2B through FIG. 5, elements with like element numbering as depicted in FIG. 2A are intended to be the same and will not necessarily be repeated for the sake of clarity.

Figure 2B:
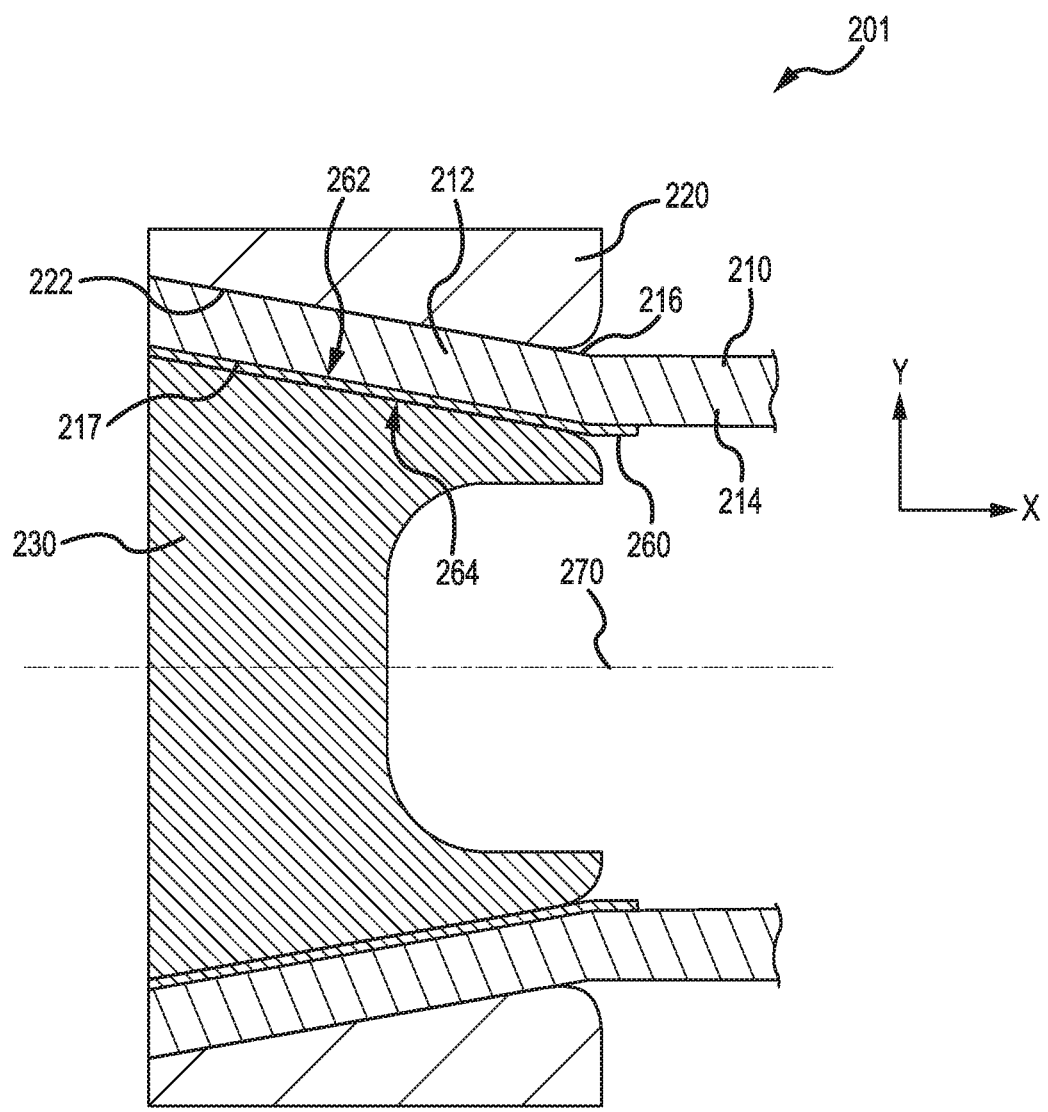
FIG. 2B illustrates a cross-section view of a metallic/composite joint having a liner disposed radially inward of the composite member having the flared end, in accordance with various embodiments.

With reference to FIG. 2B, a cross section view of a metallic/composite joint 201 is illustrated, in accordance with various embodiments. Metallic/composite joint 201 may be similar to metallic/composite joint 200 (see FIG. 2A) except that liner (also referred to herein as a second liner) 260 is provided between insert 230 and flared end 212 instead of between metallic member 220 and flared end 212.

In this regard, metallic/composite joint 201 may comprise liner 260. A first side 262 of liner 260 may be in contact with inner surface 217 of flared end 212. A second side 264 of liner 260 may be in contact with insert 230.

Figure 2C:
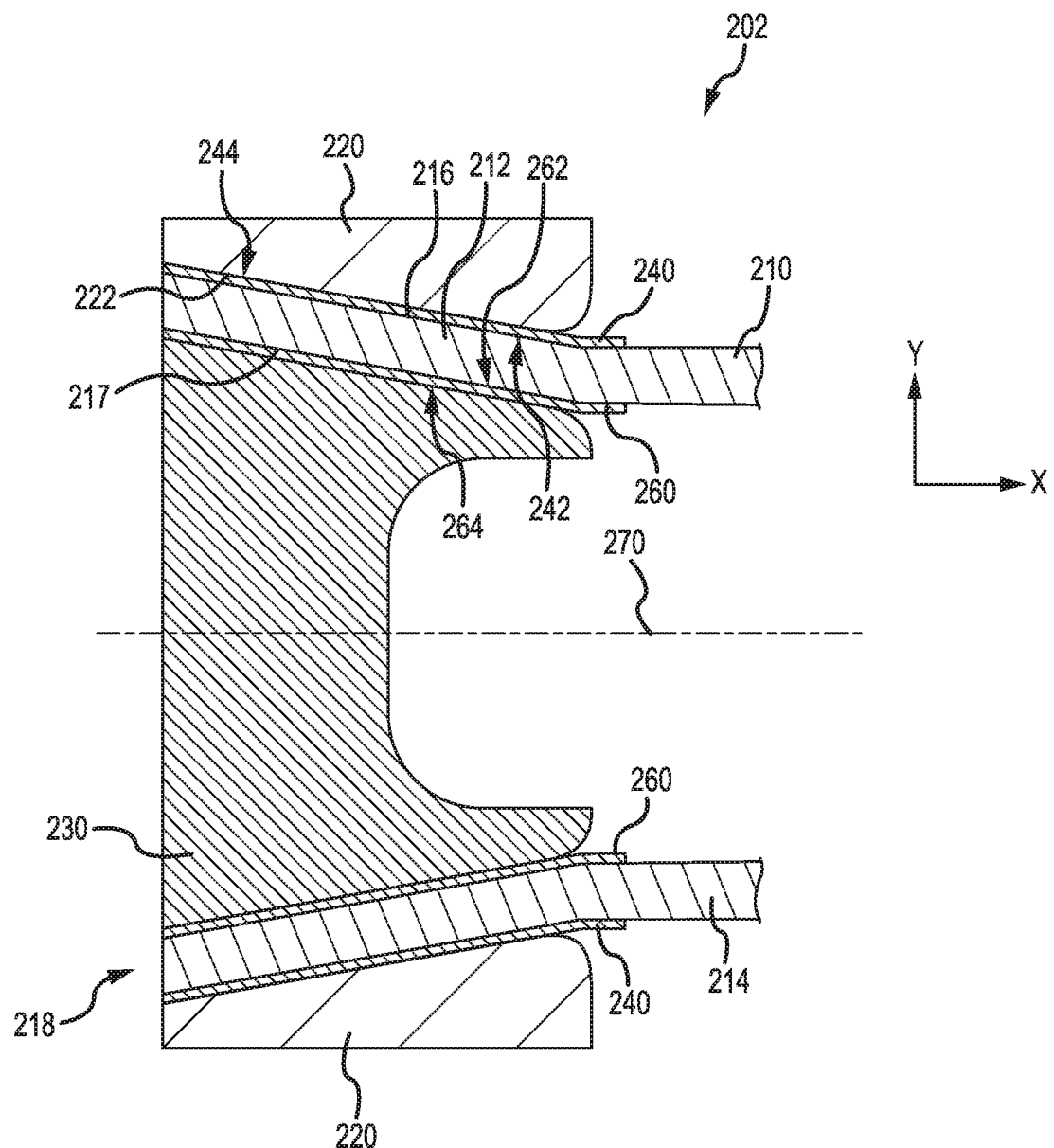
FIG. 2C illustrates a cross-section view of a metallic/composite joint having a liner disposed radially outward of the composite member having the flared end and having an additional liner disposed radially inward of the composite member having the flared end, in accordance with various embodiments.

With reference to FIG. 2C, a cross section view of a metallic/composite joint 202 is illustrated, in accordance with various embodiments. Metallic/composite joint 202 may be similar to metallic/composite joint 200 (see FIG. 2A) and metallic/composite joint 201 (see FIG. 2B) with both liner 240 provided between flared end 212 and metallic member 220 and liner 260 provided between insert 230 and flared end 212. In this regard, metallic/composite joint 202 may comprise both liner 240 and liner 260.

Figure 2D:
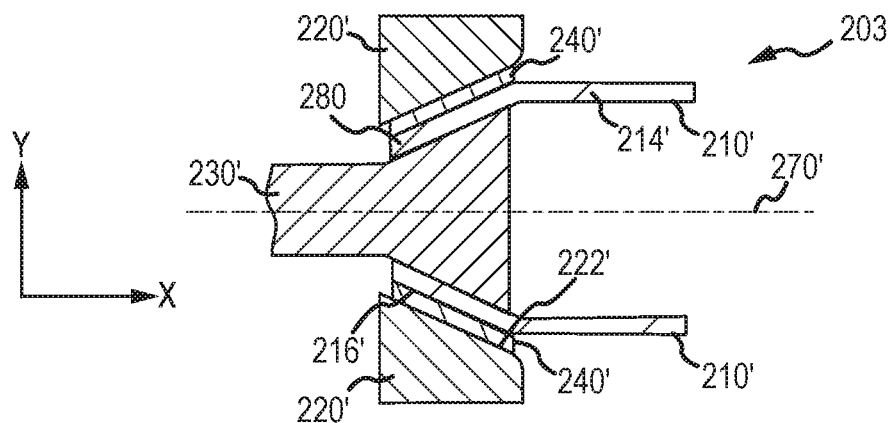
FIG. 2D illustrates a cross-section view of a metallic/composite joint having a liner disposed radially outward of a composite member having an angled end, in accordance with various embodiments.

With reference to FIG. 2D, a cross section view of a metallic/composite joint 203 with the composite member 210' having an angled end 280 is illustrated, in accordance with various embodiments. Composite member 210' may comprise a cylinder 214' having an angled end 280. Angled end 280 may comprise outer surface 216'. Outer surface 216' may be oriented at an angle with respect to centerline axis 270'. Angled end 280 may be angled inward from cylinder 214' towards centerline axis 270'. In this regard, liner 240' may be disposed between angled end 280 and metallic member 220'. Liner 240' may be located between inner surface 222' and outer surface 216'.

Figure 2E:
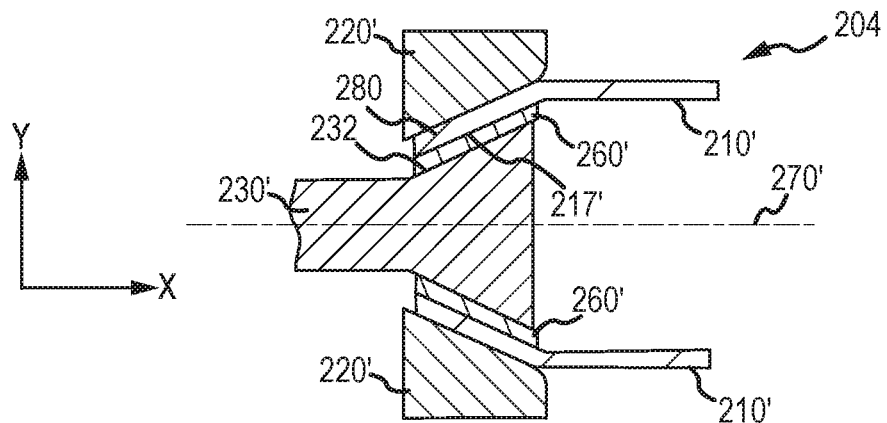
FIG. 2E illustrates a cross-section view of a metallic/composite joint having a liner disposed radially inward of the composite member having the angled end, in accordance with various embodiments.

With reference to FIG. 2E, a cross section view of a metallic/composite joint 204 with the composite member 210' having angled end 280 is illustrated, in accordance with various embodiments. Liner 260' may be disposed between angled end 280 and insert 230'. Liner 260' may be located between inner surface 217' and outer surface 232 of insert 230'.

Figure 2F:
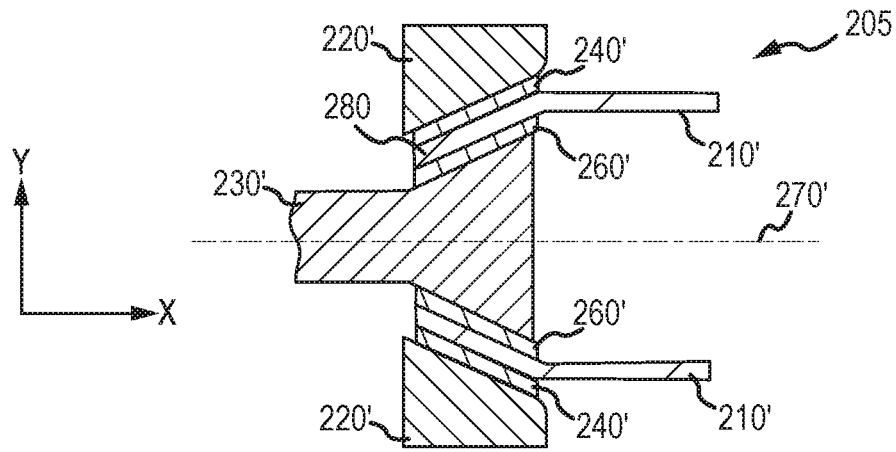
FIG. 2F illustrates a cross-section view of a metallic/composite joint having a liner disposed radially outward of the composite member having the angled end and having an additional liner disposed radially inward of the composite member having the angled end, in accordance with various embodiments.

With reference to FIG. 2F, a cross section view of a metallic/composite joint 205 with the composite member 210' having angled end 280 is illustrated, in accordance with various embodiments. Metallic/composite joint 205 may comprise both liner 240' disposed between angled end 280 and metallic member 220' and liner 260' disposed between angled end 280 and insert 230'.

Figure 3A:
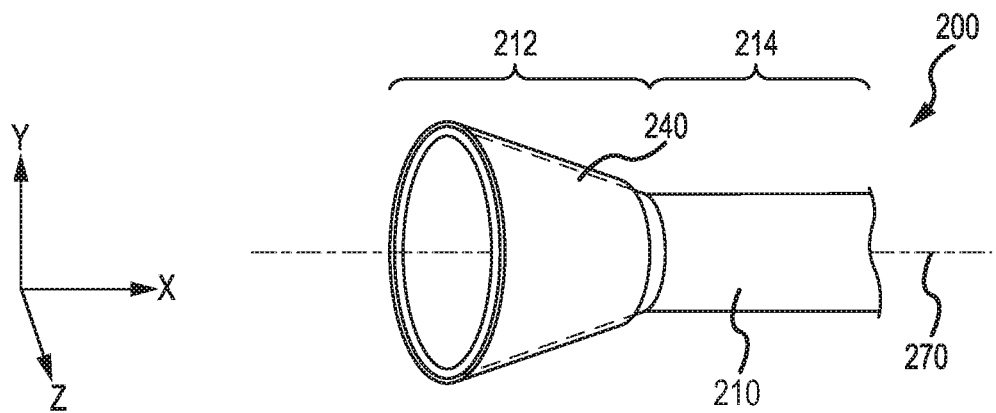
FIG. 3A illustrates a perspective view of the metallic/composite joint of FIG. 2A, in accordance with various embodiments.

With reference to FIG. 3A, a perspective view of composite member 210 having liner 240 coupled to the outer surface of flared end 212 is illustrated, in accordance with various embodiments. Flared end 212 and liner 240 may comprise a frustoconical geometry. The geometry of liner 240 is complementary to the geometry of flared end 212. Although illustrated as comprising a circular cross-section, it is contemplated herein that composite member 210 may comprise an ellipsoidal, square, rectangular, trapezoidal, or any other geometry. Liner 240 may be disposed over flared end 212 as illustrated in FIG. 3A, or may further extend (in the x-direction) over cylinder 214, in addition to flared end 212. The same implementation may be applied to two-dimensional joints as illustrated in FIG. 3B.

Figure 3B:
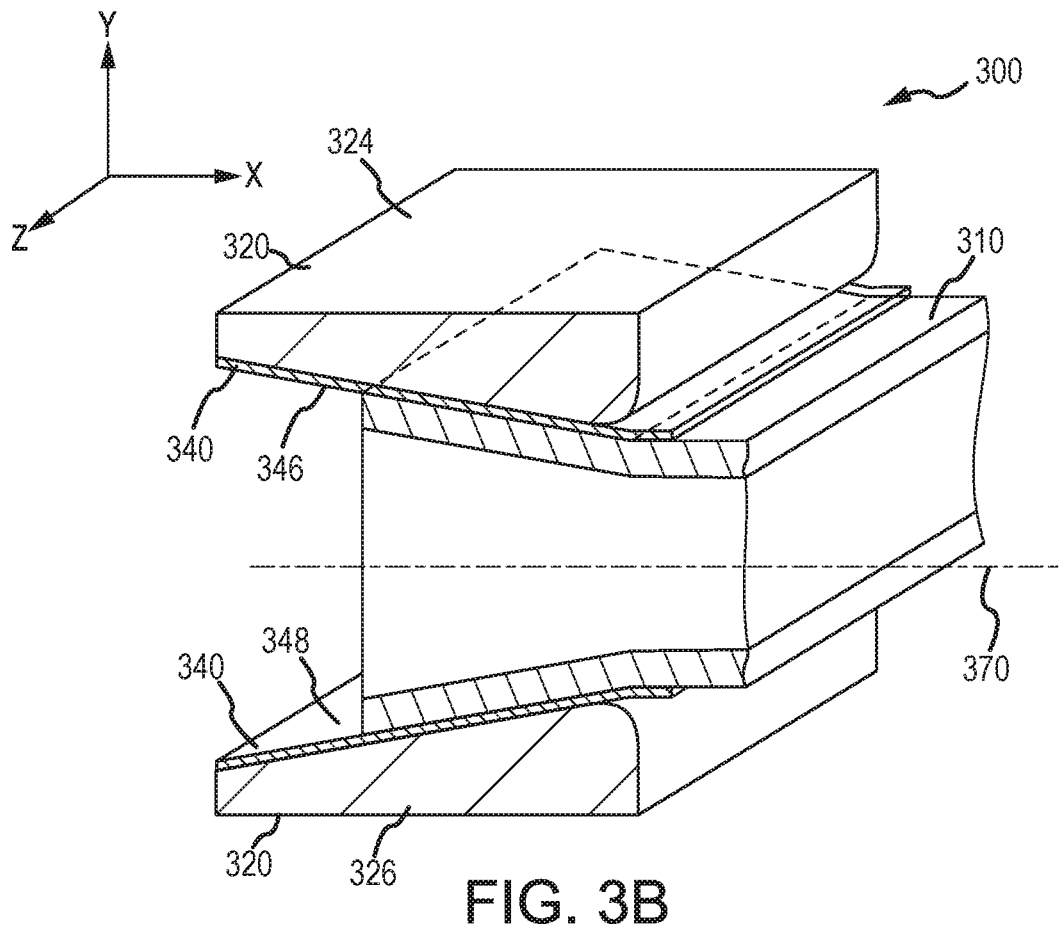
FIG. 3B illustrates a perspective view of a metallic/composite joint having a non-cylindrical geometry, in accordance with various embodiments.

With reference to FIG. 3B, a perspective view of a metallic/composite joint 300 comprising non-cylindrical elements is illustrated, in accordance with various embodiments. Metallic/composite joint 300 may comprise composite member 310, metallic member 320, and/or liner 340. In various embodiments, composite member 310, metallic member 320, and liner 340 may be similar to composite member 210, metallic member 220, and liner 240, respectively, with momentary reference to FIG. 2A. Composite member 310 may extend along centerline axis 370. Composite member 310 may comprise a rectangular geometry (in the yz-plane), as illustrated in FIG. 3B. Similarly, metallic member 320 may comprise a rectangular geometry (in the yz-plane), as illustrated in FIG. 3B. Liner 340 may comprise an upper liner 346 disposed between first metallic member 324 and composite member 310. Liner 340 may comprise a lower liner 348 disposed between second metallic member 326 and composite member 310. Metallic/composite joint 300 may comprise more complex implementations where its size, shape, and/or orientation along the z-direction are not constant.

Figure 4:
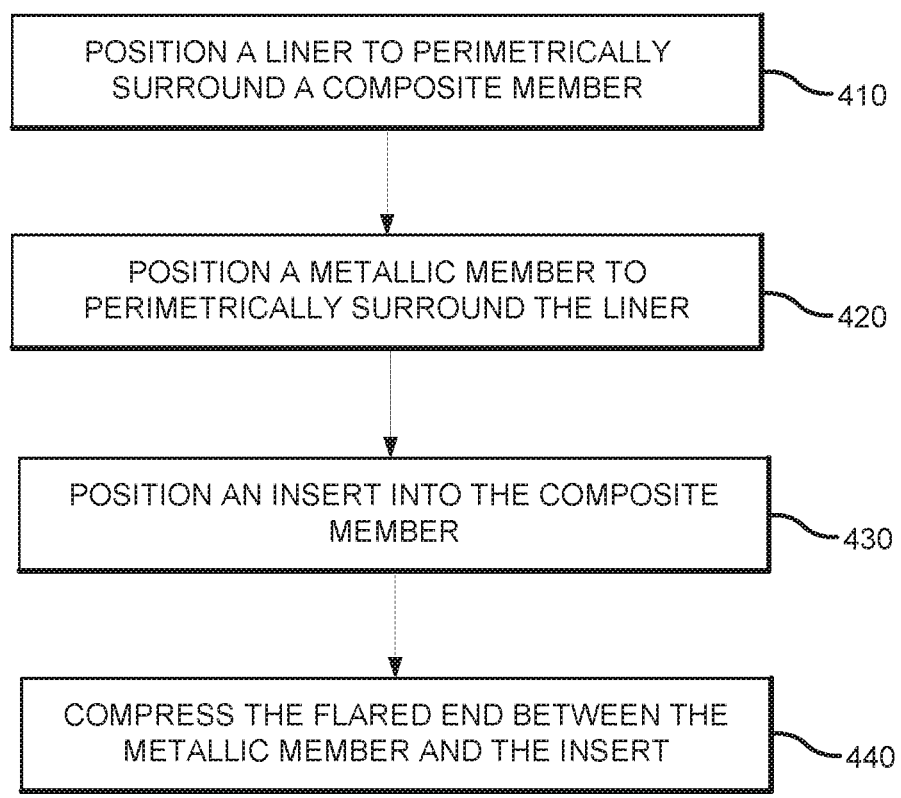
FIG. 4 illustrates a method for assembling a metallic/composite joint, in accordance with various embodiments.

With reference to FIG. 4, a method 400 for assembling a metallic/composite joint is illustrated. Method 400 includes positioning a liner to perimetrically surround at least a portion of a composite member (step 410). Method 400 includes positioning a metallic member to perimetrically surround the liner (step 420). In various embodiments, method 400 may include positioning an insert at least partially into the flared end (step 430). Method 400 may include compressing the flared end between the metallic member and the insert (step 440). The metallic member and the insert may also be made of other materials, for example, composite materials reinforced primarily in the hoop direction, composite materials with three-dimensional fabric reinforcement, or other homogeneous or heterogeneous materials with sufficient stiffness and strength to provide structural integrity of the joint under applied load.

With combined reference to FIG. 4, FIG. 2C, and FIG. 2F, step 410 may include positioning liner 240 to perimetrically surround at least a portion of a flared end 212 of composite member 210. Step 410 may include positioning liner 240 to perimetrically surround at least a portion of angled end 280 of composite member 210. Step 420 may include positioning metallic member 220 to perimetrically surround the flared end 212 of the composite member 210. Step 420 may include positioning metallic member 220 to perimetrically surround the angled end 280 of the composite member 210. Step 430 may include positioning insert 230 at least partially into the flared end 212. Step 430 may include positioning insert 230 at least partially into the angled end 280. Step 440 may include compressing the flared end 212 between the metallic member 220 and the insert 230. Step 440 may include compressing the angled end 280 between the metallic member 220 and the insert 230. The compressing may comprise moving insert 230 in the axial direction (i.e., the positive x-direction) relative to metallic member 220. The compressing may comprise moving metallic member 220 in the axial direction (i.e., the negative x-direction) relative to insert 230.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A metallic/composite joint comprising:
   a composite member extending along a centerline axis, wherein an end section of the composite member is one of:
   (a) a flared end section wherein an outer surface of the composite member diverges from the centerline axis in a direction towards a terminus of the composite member; or
   (b) an angled end section wherein the outer surface of the composite member converges towards the centerline axis in the direction towards the terminus of the composite member;
   a liner perimetrically surrounding the end section of the composite member; and
   a metallic member perimetrically surrounding the liner,
   wherein a first side of the liner contacts the end section of the composite member and a second side of the liner contacts the metallic member, and
   wherein a wall thickness of the liner at a location of the liner radially aligned with the end section of the composite member is less than a wall thickness of the composite member,
   the composite member comprises a first material, the liner comprises a second material, and a through-thickness compressive stiffness of the second material is less than a through-thickness compressive stiffness of the first material of the same dimensions.

2. The metallic/composite joint of claim 1, further comprising an insert positioned at least partially within the end section.

3. The metallic/composite joint of claim 2, wherein the end section is compressed between the metallic member and the insert.

4. The metallic/composite joint of claim 3, further comprising a second liner perimetrically surrounding the insert.

5. The metallic/composite joint of claim 4, wherein a first side of the second liner contacts the composite member and a second side of the second liner contacts the insert.

6. The metallic/composite joint of claim 5, wherein the first side of the second liner contacts the end section of the composite member.

7. The metallic/composite joint of claim 1, wherein a stiffness of the liner is less than a stiffness of the composite member.

8. The metallic/composite joint of claim 7, wherein the liner comprises at least one of an elastic polymer (elastomer), a polymer, or a fabric.

9. The metallic/composite joint of claim 1, wherein an inner surface of the composite member diverges from the centerline axis in response to the end section comprising the flared end section, or the inner surface of the composite member converges towards the centerline axis in response to the end section comprising the angled end section.

10. The metallic/composite joint of claim 1, wherein the metallic member is spaced apart from the end section via the liner.

11. A metallic/composite joint comprising:
    a composite member extending along a centerline axis, wherein an end section of the composite member is one of:
    (a) a flared end section wherein an outer surface of the composite member diverges from the centerline axis in a direction towards a terminus of the composite member; or
    (b) an angled end section wherein the outer surface of the composite member converges towards the centerline axis in the direction towards the terminus of the composite member;
    a metallic member at least partially perimetrically surrounding the end section;
    an insert positioned at least partially within the end section; and
    a liner perimetrically surrounding the insert,
    wherein a first side of the liner contacts the end section of the composite member and a second side of the liner contacts the insert, and
    wherein a wall thickness of the liner at a location of the liner radially aligned with the end section of the composite member is less than a wall thickness of the composite member,
    the composite member comprises a first material, the liner comprises a second material, and a through-thickness compressive stiffness of the second material is less than a through-thickness compressive stiffness of the first material of the same dimensions.

12. The metallic/composite joint of claim 11, wherein the liner is located between the composite member and the insert.

13. The metallic/composite joint of claim 12, wherein the end section is compressed between the metallic member and the insert.

14. The metallic/composite joint of claim 13, further comprising a second liner perimetrically surrounding the composite member.

15. The metallic/composite joint of claim 14, wherein a first side of the second liner contacts the end section of the composite member and a second side of the second liner contacts the metallic member.

16. The metallic/composite joint of claim 11, wherein the liner comprises at least one of an elastic polymer (elastomer), a polymer, or a fabric.

17. A method for assembling a metallic/composite joint comprising:
- positioning a liner to perimetrically surround an end section of a composite member; and
- positioning a metallic member to perimetrically surround the liner,
- wherein the composite member extends along a centerline axis and the end section of the composite member is one of:
  - (a) a flared end section wherein an outer surface of the composite member diverges from the centerline axis in a direction towards a terminus of the composite member; or
  - (b) an angled end section wherein the outer surface of the composite member converges towards the centerline axis in the direction towards the terminus of the composite member;
- wherein the liner is located between the metallic member and the composite member,
- a through-thickness compressive stiffness of the liner is less than a through-thickness compressive stiffness of the composite member, and
- wherein a wall thickness of the liner at a location of the liner radially aligned with the end section of the composite member is less than a wall thickness of the composite member,
- the composite member comprises a first material, the liner comprises a second material, and a through-thickness compressive stiffness of the second material is less than a through-thickness compressive stiffness of the first material of the same dimensions.

18. The method of claim 17, further comprising:
- positioning an insert at least partially into the end section of the composite member; and
- compressing the end section of the composite member between the metallic member and the insert.

* * * * *